(12) United States Patent
Koestler (10) Patent No.: US 6,834,878 B2
(45) Date of Patent: Dec. 28, 2004

(54) TRAILER HITCH ALIGNMENT SYSTEM, KIT AND METHOD

(76) Inventor: Leo C. Koestler, Frontage Rd., Edwards, MI (US) 39066

( * ) Notice: Subject to any disclaimer, the term of this patent is extended or adjusted under 35 U.S.C. 154(b) by 0 days.

(21) Appl. No.: 10/260,794

(22) Filed: Sep. 30, 2002

(65) Prior Publication Data

US 2003/0209880 A1 Nov. 13, 2003

Related U.S. Application Data

(60) Provisional application No. 60/378,741, filed on May 8, 2002.

(51) Int. Cl.[7] .............................................. B60D 1/00
(52) U.S. Cl. ..................................................... 280/477
(58) Field of Search ........................ 280/477; 248/467; 40/591, 600; 293/128, DIG. 6

(56) References Cited

U.S. PATENT DOCUMENTS

| | | | | |
|---|---|---|---|---|
| 3,889,384 A | * | 6/1975 | White | 33/264 |
| 4,666,176 A | * | 5/1987 | Sand | 280/477 |
| 4,871,205 A | * | 10/1989 | Bray | 293/128 |
| 5,113,588 A | * | 5/1992 | Walston | 33/264 |
| 5,558,352 A | * | 9/1996 | Mills | 280/477 |
| 6,062,160 A | * | 5/2000 | Delcambre | 116/28 R |
| 6,179,354 B1 | * | 1/2001 | Bennett, Jr. | 293/128 |
| 6,209,902 B1 | * | 4/2001 | Potts | 280/477 |
| 6,239,926 B1 | * | 5/2001 | De Shazer | 359/841 |
| 6,386,572 B1 | * | 5/2002 | Cofer | 280/477 |
| 6,422,585 B1 | * | 7/2002 | Glass | 280/477 |
| 2003/0178809 A1 | * | 9/2003 | Anderson | |

* cited by examiner

Primary Examiner—Lesley D. Morris
Assistant Examiner—Tony Winner
(74) Attorney, Agent, or Firm—Michael J. Persson; Lawson & Persson, P.C.

(57) ABSTRACT

A system, kit and method for aligning a vehicle mounted connector with a trailer-mounted connector. The system and kit include a first rod, which is mounted to a trailer, and a second rod, which is mounted to the rear portion of a vehicle in a location corresponding to the location of the first rod on the trailer. The first rod includes a first connector at one end, for attachment to the trailer, and a first target mounted at the other end. The second rod includes a second connector at one end for attachment to the vehicle, and a second target mounted at its other end. The second rod is attached to the rear portion of the vehicle and extends rearward toward the trailer and upward such that is may be viewed through the rear window of the vehicle and is at substantially the same height as the first target.

18 Claims, 7 Drawing Sheets

FIG. 7A

TRAILER HITCH ALIGNMENT SYSTEM, KIT AND METHOD

CLAIM OF PRIORITY

This application claims the benefit of priority under Title 35, United States Code §119(e), of U.S. Provisional Patent Application Ser. No. 60/378,741, filed May 8, 2002.

FIELD OF THE INVENTION

The present invention relates to the field of trailer coupling systems and, in particular, to a system, kit and method for aligning a vehicle mounted coupling to a trailer mounted coupling.

BACKGROUND OF THE INVENTION

A trailer is typically attached to a towing vehicle using a trailer hitch, which includes a vehicle mounted coupling, such as a ball mounted on the rear of the vehicle, and a trailer mounting coupling, to which a the vehicle mounted coupling is secured. Aligning the trailer hitch ball with the trailer coupling, however, has always been cumbersome and difficult, especially for an unassisted driver. Typically, the driver reverses the vehicle towards the trailer while attempting to observe the trailer coupling and vehicle mounted coupling in the rear or side view mirror. However, because of the position and size of the mirrors, the couplings are not always visible, requiring the driver to reverse and advance the vehicle repeatedly before successfully maneuvering the vehicle mounted coupling in the vicinity of the trailer mounted coupling. Further, even if both components are visible, the driver's depth perception is hindered such that the towing vehicle often collides with the trailer. At best, the driver is able to position the trailer hitch ball within a few feet of the trailer coupling eventually requiring the driver to manually move the trailer until the coupling is properly positioned over the ball.

A number of devices have been developed to assist in the alignment of vehicle mounted coupling with a trailer-mounted coupling. These devices operate in a variety of manners, but can be generally grouped into two different categories; mirror based systems, and rod based systems.

Mirror based systems generally utilize specialized mirrors to allow the user to view the alignment of the vehicle mounted coupling and the trailer mounted coupling, either directly or via the use of specialized targets. One example of a mirror-based system is disclosed in U.S. Pat. No. 5,309,289. In this system, a cross-shaped target is mounted on each hitch component and a convex mirror assembly is mounted to the trailer to allow a vehicle operator to view the two targets. The vehicle is backed toward the trailer until the two cross-shaped targets are aligned.

Another example of a mirror based system is disclosed in U.S. Pat. No. 5,482,310, which discloses a trailer hitch mirror alignment device including a mounting bracket with a pair of telescopically adjustable legs attached thereto. A mirror is pivotally and adjustably attached to the distal ends of the legs. The bracket is magnetically attachable to the rear surface of the towing vehicle. The device can be adjusted to allow the driver to view both components of the trailer hitch assembly.

A second example of a mirror based system is disclosed in U.S. Pat. No. 6,357,126, titled "Trailer hitch alignment device". This patent discloses a device for a aligning a trailer hitch ball with a trailer coupling that includes an elongated guide strip that is positioned on the ground with a portion immediately beneath the ball on the towing vehicle and a second portion immediately beneath the trailer coupling. A first target is mounted on the trailer hitch ball while a second target is mounted on the trailer coupling. A convex mirror assembly is mounted on the rear of the towing vehicle and is positioned such that the towing vehicle driver can see the trailer hitch ball and the target mounted thereon. The towing vehicle driver reverses the vehicle while guiding the first target along the alignment strip and, when the driver observes that the first and second targets are aligned, the coupling is properly aligned with the trailer hitch ball.

Unfortunately, mirror based systems have a number of drawbacks that have limited their appeal. First, the mirrors generally need to be permanently mounted to the trailer or vehicle, risking breakage and/or hindrance of the operation of the trailer. Second, the use of a mirror creates issues with depth perception that could cause misalignment. Third, mirror based systems can be costly and difficult to install, further limiting their appeal. Finally, the view through a mirror is deceptive due to the fact that the user is viewing an inverse image of what is actually occurring, resulting in the user turning the vehicle in the wrong direction based upon the visual cues provided by the mirror.

Rod based systems typically utilize vertical rods that are arranged so as to provide the driver with an indirect means of determining the relative locations of the vehicle mounted connector and the trailer mounted connector. One example of such a system is disclosed in U.S. Pat. No. 4,708,359, which discloses a trailer hitching apparatus including a pair of sight rods attached adjacent each side of the trailer hitch ball. The sight rods extend outwardly so as to be readily visible to the vehicle driver. A trailer-sighting rod is attached to the trailer coupling; an angled loading plate is positioned between the two sighting rods and includes an opening surrounded by a load pin guide rail. A loading pin is attached to the trailer tongue directly above the coupling. As the vehicle is reversed, the driver will guide the vehicle such that the vehicle sighting rods will be on each side of the trailer sighting rod thereby guiding the load pin onto the angled loading plate until the pin seats within the plate opening. Simultaneously, the trailer hitch coupling is automatically lifted onto the trailer hitch ball.

The device disclosed in this patent overcomes some of the drawbacks inherent in the mirror-based systems. For example, because it does not require the use of a mirror, there are no issues with depth perception or viewing an inverse image that could cause misalignment. However, this device is not without its drawbacks. First, the narrow profile of the rods reduces their visibility and increases the difficulty of alignment. Second, the automatic coupling feature requires the use of a specialized coupling, increasing the cost of the system and making it unsuitable for use with existing trailer hitches.

U.S. Pat. No. 5,680,706 discloses a device for aligning a trailer and towing vehicle including a visible mast that is placed on the trailer tongue so that the towing vehicle driver can view the mast. The mast includes a pivotal leg that can be secured in either an extended or collapsed position. When it is an extended position, it is aligned with a target disposed on the rear window of the towing vehicle and, when brought into contact therewith, the driver knows that the ball and tongue are aligned.

The device disclosed in this patent also has significant drawbacks. First, it requires that the mast be permanently affixed to the trailer, risking breakage and interference with the proper operation of the trailer. Second, and most importantly, the requirement that the vehicle window come into contact with the end of the pivotal leg is a considerable drawback as it risks damage to the window.

U.S. Pat. No. 6,341,794 discloses a trailer hitch alignment apparatus that includes a first guide member removably attached to a vehicle bumper and a second guide member removably attached to a trailer hitch socket. The first guide member includes a magnetic base with a telescopically extensible rod adjustably coupled thereto. The second guide member includes a magnetic base having an upwardly extending telescopic rod and a downwardly extending semi-flexible shaft attached thereto. The shaft extends downwardly through a bore defined by the trailer hitch tongue so as to contact the trailer hitch ball when the ball and socket are aligned. Contact between the shaft and ball causes vertical displacement of the shaft and guide rod. Therefore, the two telescopic guide rods, visible from a driver's seat, facilitates lateral alignment of the ball and socket while vertical displacement of the second rod indicates perfect forward alignment.

This device disclosed in this patent overcomes some of the drawbacks inherent in the mirror-based systems and in the rod based systems discussed above. For example, it is readily removable via the magnets and, therefore, does not need to be permanently mounted to the trailer or vehicle. However, this device is not without its drawbacks. First, this device requires a specialized trailer tongue, having a bore disposed therethrough, be utilized. This requires the purchase of a specialized tongue or a retrofit of an existing tongue, which may or may not be possible. Further, the narrow profile of the rods reduces their visibility and increases the difficulty of alignment. Finally, the vertical displacement of the rod creates a risk of breakage or wear of the rods over time, limiting their longevity.

Therefore, there is a need for a system, kit and method of aligning a vehicle mounted connector and a trailer mounted connector that allow a trailer to be properly aligned and hitched to the vehicle, that does not need to be permanently mounted to the trailer or vehicle, that does not risk breakage of the system and/or hindrance of the operation of the trailer, that does not create issues with depth perception or viewing an inverse image of what is actually occurring, that are not costly and difficult to install, that does not risk damage to the window of the vehicle, that may be used with any hitch system using a trailer mounted connector and vehicle mounted connector, and that uses highly visible targets for assisting in such alignment.

SUMMARY OF THE INVENTION

The present invention is a system, kit and method for aligning a vehicle-mounted connector with a trailer-mounted connector. In its most basic form the system and kit include a first rod, which is mounted to a trailer, and a second rod, which is mounted to the rear portion of a vehicle in a location corresponding to the location of the first rod on the trailer. The first rod includes a first connector at one end, for attachment to the trailer, and a first target mounted at the other end. The second rod includes a second connector at one end for attachment to the vehicle, and a second target mounted at its other end. The second rod is attached to the rear portion of the vehicle and extends rearward toward the trailer a distance equal to the sum of the distance between the rear portion of the vehicle and the vehicle mounted connector plus a distance between the trailer-mounted connector and the first rod. When assembled to the rear portion of the vehicle, the second target is visible through the rear window of the vehicle and at substantially the same height as the first target mounted to the first rod.

In the preferred embodiments of the system and kit, the first and second rods are telescoping rods, which include friction nuts to allow each to be easily adjusted and secured in the proper positions. The preferred first connector and second connector include magnets for mounting to metallic portions of the trailer mounting assembly. The preferred first target is a reflector having an outer ring of one color and an inner circle of another color such that the first target looks similar to a "bulls eye". The preferred first target is fixedly mounted to the telescoping first rod via glue and material. However, in embodiments of the system and kit in which fixed rods are utilized, the first target is preferably mounted to the first rod via adjustable means.

In some embodiments of the system and kit in which the connectors utilized magnets, the connectors include a means for preventing the magnets from coming into direct contact with the surface of the vehicle. This may be accomplished via plurality of nubs or via other art recognized means.

In other embodiments of the invention, the first rod includes a light disposed proximate to the first target for illuminating the first target during alignment. It is preferred that this light be a specialized adjustable light that is mounted to the rod via a clip that is disposed about and exerts a spring force upon the first rod. The clip is preferably mounted to the light via an arm that is pivotal connected thereto in order to allow the light to be aimed at the target. In still other embodiments, the adjustable light is mounted to the second rod proximate the second target and is aimed at the first target such that the reflection of the light from the first target indicates proper alignment as the vehicle is backed toward the trailer.

The method of the present invention includes the steps of attaching the first rod to a trailer and attaching a second rod to the vehicle. The length of the second rod is adjusted to extend a distance equal to the sum of the distance between the rear portion of the vehicle and the vehicle mounted connector plus a distance between the trailer-mounted connector and the first rod, and the height of the first target is adjusted to correspond to the height of the second target. Once the attaching and adjusting steps have been performed, the vehicle is backed toward the trailer until the second target makes contact with the first target. The vehicle is then stopped and, because of the alignment of the targets relative to the vehicle-mounted connector and the trailer-mounted connector, the vehicle-mounted connector will be in proper position for immediate coupling with the trailer-mounted connector. The vehicle-mounted connector is then coupled with the trailer-mounted connector to complete the installation.

Therefore, it is an aspect of the invention to provide a trailer hitch alignment system, kit and method that allow a trailer to be properly aligned and hitched to the vehicle.

It is a further aspect of the invention to provide a trailer hitch alignment system, kit and method that does not need to be permanently mounted to the trailer or vehicle.

It is a further aspect of the invention to provide a trailer hitch alignment system, kit and method that does not risk breakage of the system and/or hindrance of the operation of the trailer.

It is a further aspect of the invention to provide a trailer hitch alignment system, kit and method that does not create issues with depth perception or viewing an inverse image of what is actually occurring.

It is a further aspect of the invention to provide a trailer hitch alignment system, kit and method that is not costly and difficult to install.

It is a further aspect of the invention to provide a trailer hitch alignment system, kit and method that does not risk damage to the window of the vehicle.

It is a further aspect of the invention to provide a trailer hitch alignment system, kit and method that may be used with any hitch system using a trailer mounted connector and vehicle mounted connector.

It is a still further aspect of the invention to provide a trailer hitch alignment system, kit and method that uses highly visible targets for assisting in aligning the vehicle mounted coupling and the trailer mounted coupling.

It is a still further aspect of the invention to provide a trailer hitch alignment system that utilizes an adjustable light.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
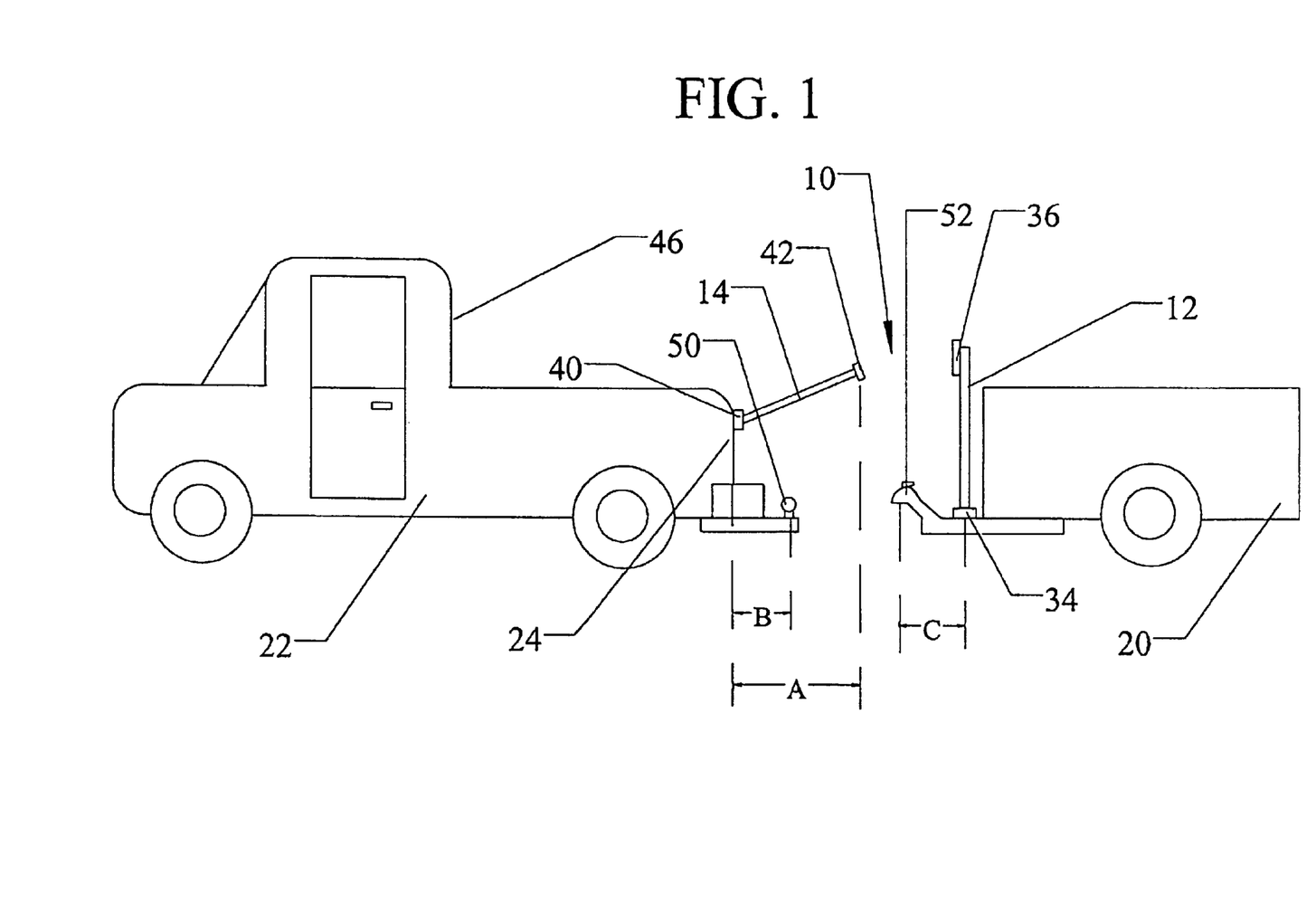
FIG. 1 is a side view of one embodiment of the system of the present invention mounted to a vehicle and a trailer.

Referring first to FIG. 1, the system 10 of the present invention includes a first rod 12, which is mounted to a trailer 20, and a second rod 14, which is mounted to the rear portion 24 of a vehicle 22 in a location corresponding to the location of the first rod 12 on the trailer 20. The first rod 12 includes a first connector 34 at one end, for attachment to the trailer 20, and a first target 36 mounted at, the other end. The second rod 14 includes a second connector 40 at one end for attachment to the vehicle 22, and a second target 42 mounted at its other end. The second rod 14 is attached to the rear portion 24 of the vehicle 22 and extends rearward toward the trailer 20 a distance A, which is equal to the distance B between the rear portion 24 of the vehicle 22 and the vehicle mounted connector 50, here a ball, plus a distance C between the trailer mounted connector 52, here a tongue, and the first rod 12. When assembled to the rear portion 24 of the vehicle 22, the second target 42 must be visible through the rear window 46 of the vehicle 22 and at substantially the same height as the first target 36 mounted to the first rod 12.

In operation, the first rod 12 and second rod 14 are assembled and attached to the trailer 20 and vehicle 22 in the positions described above. The vehicle 22 is then backed toward the trailer 20 causing the second target 42 to approach the first target 36. Because of the large size of the first and second targets 36, 42, they are easily seen by the driver, who may make adjustments to the position of the vehicle 22 based upon the relative locations of the first and second targets 36, 42 in order to align the targets 36, 42 with one another. Once the second target 42 is properly aligned with the first target 36, the driver will back the vehicle 22 straight toward the trailer 20 until the second target 42 makes contact with the first target 36. The driver will then stop the vehicle 22 and, because of the alignment of the targets 36, 42 relative to the vehicle-mounted connector 50 and the trailer-mounted connector 52, the vehicle-mounted connector 50 will be in proper position for immediate coupling with the trailer-mounted connector 52.

Figure 2:
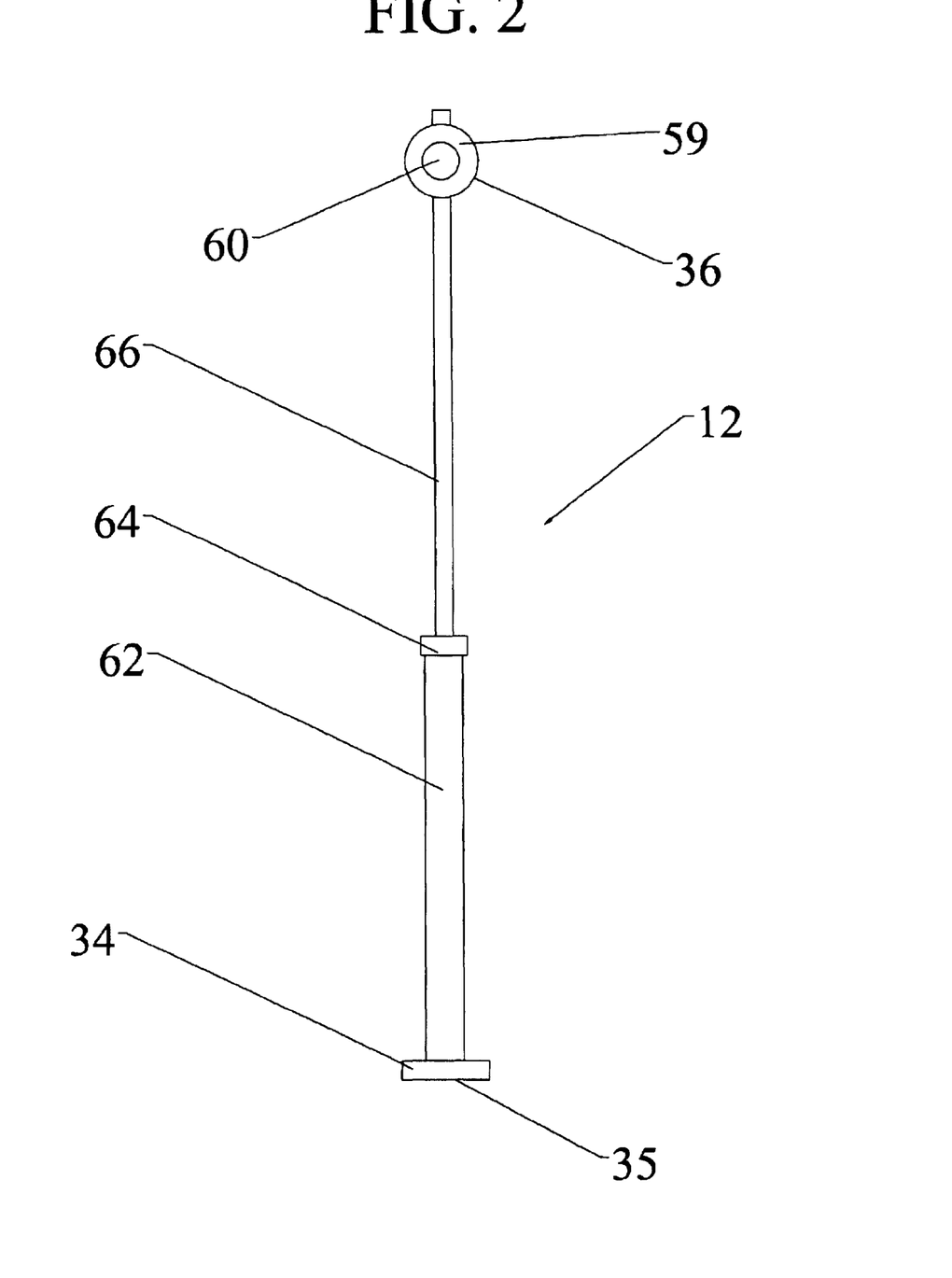
FIG. 2 is a front view of the preferred first rod of the system of the present invention.

Referring now to FIG. 2, the preferred first rod 12 of the system 10 of the present invention is shown. The preferred first rod 12 is a telescoping rod made up of a base section 62 and an extension section 66. Base section 62 is preferably fixedly attached to the first connector 34 and is substantially hollow. The preferred base section 62 is dimensioned to allow a substantial portion of the extension section 66 to fit therein to allow the height of the first target 36 to be adjusted to the height of the second target 42 on the second rod 14 and to allow the extension section 66 to be stored within the base section 62 when the first rod 12 is not in use. The preferred first rod includes a friction lock 64 that mates with threads (not shown) on the end of base section 62 and frictionally engages the extension section 66 to hold the first target 36 at the desired height. However, it is recognized that the extension section 66 may be secured using other art recognized means, such as set screws, pins or bolts that extend through spaced openings in the sections 62, 66, or the like, to achieve similar results.

The preferred base section 62 and extension section 66 are made of an inexpensive lightweight material, such as plastic, polyvinyl chloride, or the like and are painted with a highly visible paint in order to enhance visibility. However it is recognized that other materials, such as metals, may be substituted to achieve similar results. Similarly, although the first rod 12 has been described as being of a telescoping design, it is understood that non-telescoping designs may also be utilized to achieve similar results.

The preferred first connector 34 is made of the same material as the base section 62 and is joined thereto using threads, glues, plastic welds, or other art recognized joining methods. The bottom surface 35 of the preferred first connector 34 includes a plurality of round magnets (not shown, but substantially similar to those shown in FIG. 5B in connection with the second connector) that are fixedly attached to the bottom surface 35 of the first connector 34. These magnets are of sufficient magnetic strength to hold the first rod 12 in a substantially vertical position when brought into contact with a metal portion of the trailer mounted connector assembly. The use of magnets is preferred as it allows the first rod 12 to be dislodged from the trailer if impacted with extreme force rather than breaking the first rod 12 or damaging the rear portion of the vehicle. In addition, the use of magnets makes the first rod 12 easily detachable from the trailer. However, it is recognized that other art recognized attachment means, such as bolts, clamps, hook and loop fasteners, or the like, may be substituted to achieve similar results.

The preferred first target 36 is a substantially round reflector having an outer rim 59 of one color and an inner circle 60 of another color. In the preferred embodiment, the outer rim 59 is red and has a diameter of approximately three and one quarter inches, and the inner circle 60 is white and has a diameter of one and one-half inches so as to resemble a "bulls eye". However, other first targets 36 using different colors, whether or not reflective, or a single color, may also be utilized. Similarly, in other embodiments the first target 36 has a different shape, such as triangle, square, hexagon, octagon or the like. Finally, a first target 36 of a different size than the preferred target 36 may be utilized, provided the target is sufficiently large to allow the driver to differentiate the target from the first rod when backing the vehicle into position.

Figure 3:
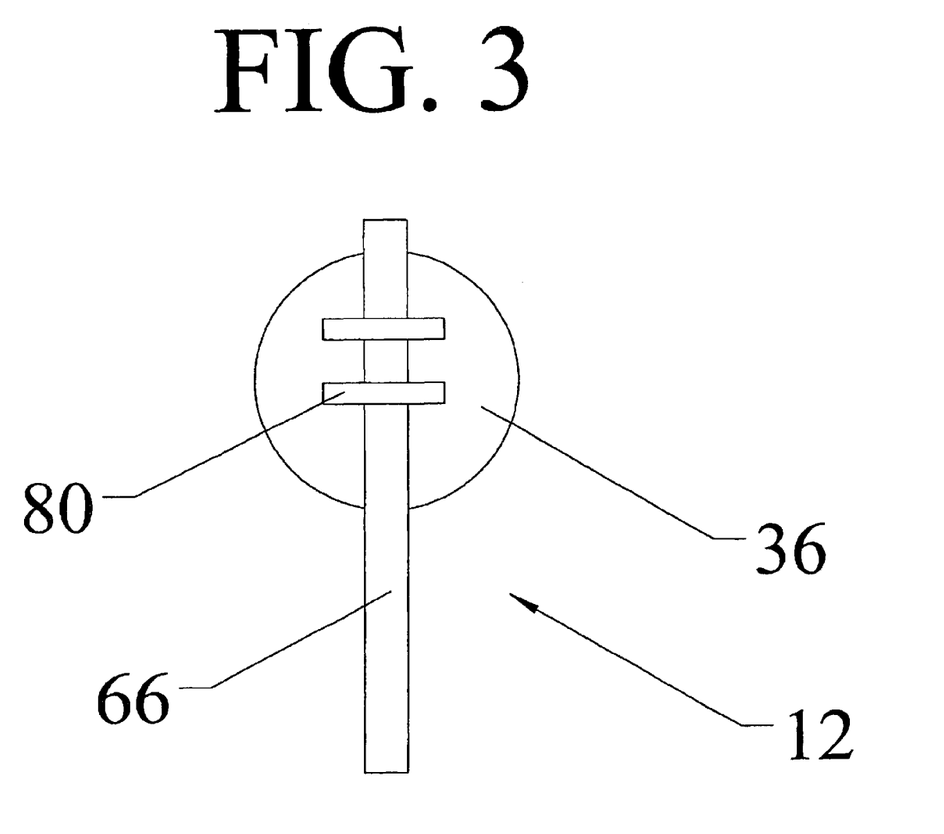
FIG. 3 is a rear view of the preferred first target and the top of the first rod showing the preferred means of mounting to the first rod of the system of the present invention.

Referring now to FIG. 3, the preferred means of mounting the first target 36 to the extension section 66 of the first rod 12 is shown. In the preferred embodiment, the first target 36 does not have any special mounting details and is simply attached to the extension section 66 by gluing strips of material across both the back surface of the first target 36 and the extension section 66. This material is preferably a nylon material, similar to that used in connection with cable ties, as such a material is relatively inexpensive and easy to apply. However, other materials, such as cloth, plastic or the like may be substituted. Similarly, the first target may include integral brackets (not shown) that allow the target to be mechanically fastened to the extension section 66 via conventional fasteners, such as screws, bolts, clamps or the like. This arrangement is preferred in embodiments utilizing a non-telescoping first rod 12, as it allows the first rod to be moved upward or downward depending upon the relative height of the second target.

Figure 4:
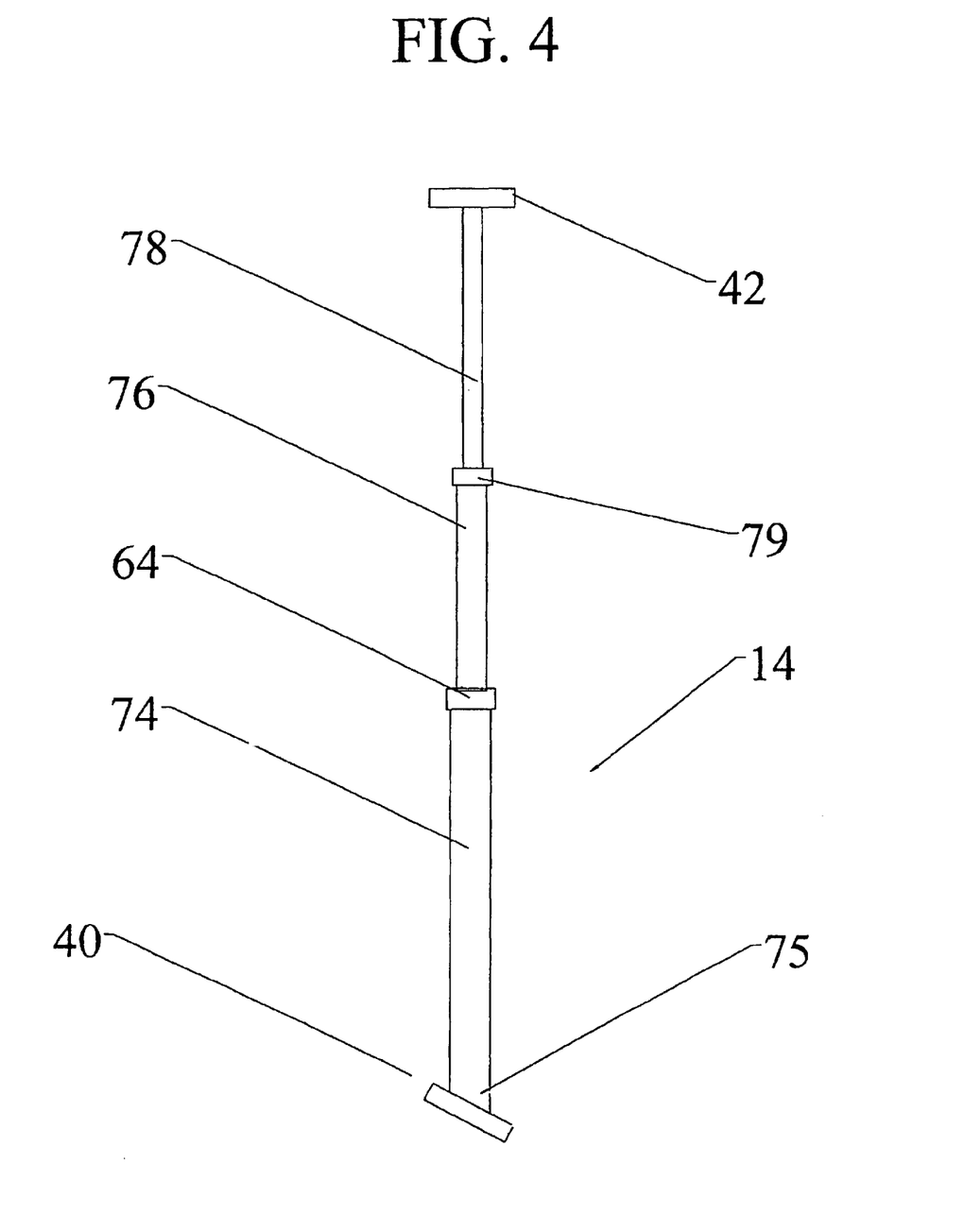
FIG. 4 is a side view of the preferred second rod of the system of the present invention.

Referring now to FIG. 4, the preferred second rod 14 is shown. The preferred second rod 14 is similar in most respects to the preferred first rod. The preferred second rod 14 is a telescoping rod, which allows the overall length of the rod 14 to be adjusted. The preferred second rod 14 includes three sections 74, 76, 78, with section 76 nesting within section 74 and section 78 nesting within sections 74 and 76. The length of the rod 14 may be adjusted by extending sections 76 and 78 and securing them in place with friction locks 64, 79. However, as was the case with the first rod, these may be secured using other means, such as set screws, pins or bolts that extend through spaced openings in the sections 74, 76, 78, or other art recognized means. The second target 42 is mounted at the end of the top section 78 and is shown in FIG. 4 as being substantially perpendicular to the end of the top section 78. However, in other embodiments, this target is angled to compensate for the angled relation between the second connector 40 and the vehicle.

The second connector 40 is similar in all respects to the first connector 34 and all options applicable to the first connector are likewise applicable to the second connector 40. However, in some embodiments, the second connector 40 may include suction cups or other means for mounting to the non-metallic portions of the rear of the vehicle rather than to the metallic rear panel. The second connector 40 preferably fixedly mounts to an angled portion 75 of the bottom section 74 of the rod to allow the rod 14 to extend upward at an angle. However, in some embodiments, the connector includes a means for altering the angle of the rod 14, such as a pivot pin and clevis with locking eyes, or other art recognized means for angling a member relative to another member.

Figure 5A:
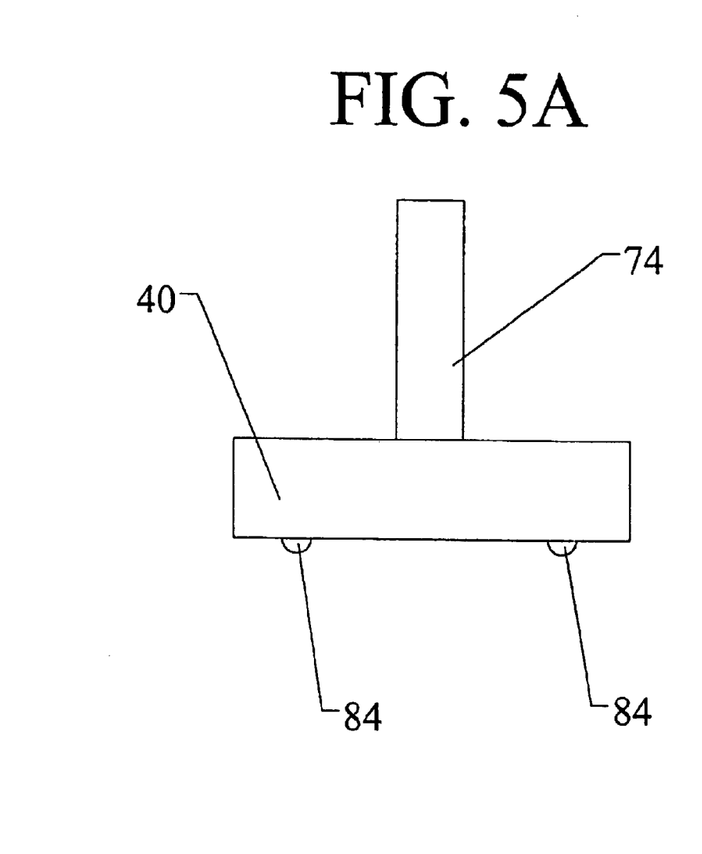
FIG. 5A is a side view of a bottom portion of one embodiment of the second rod of the system of the present invention having protective nubs on the bottom surface of the second connector.
Figure 5B:
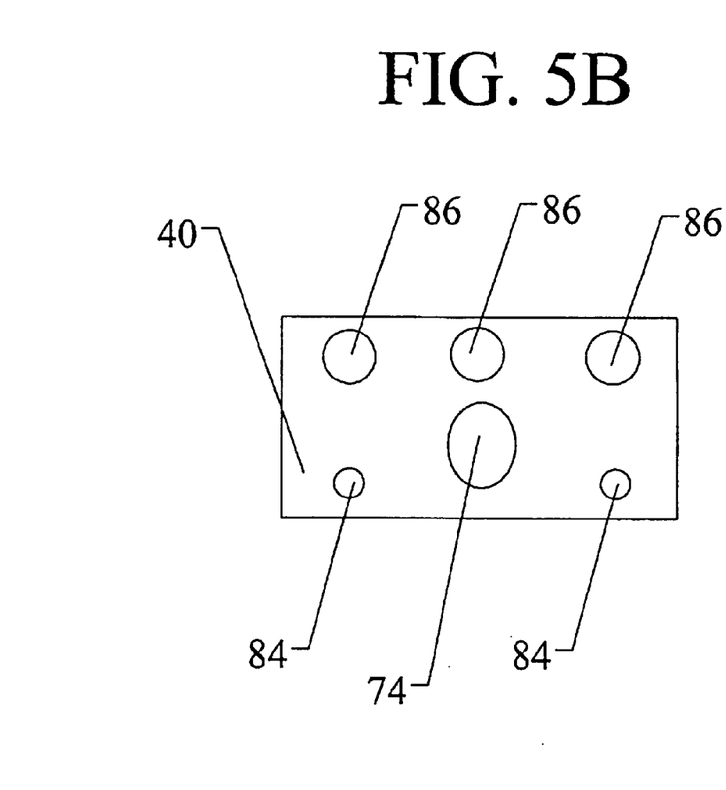
FIG. 5B is a bottom view of the second connector of the embodiment of FIG. 5A.

Referring now to FIGS. 5A and 5B, one embodiment of the second connector 40 is shown. In this embodiment, a plurality of nubs 84 are disposed upon the bottom surface of the second connector 40 in order to provide a small space between the magnets 86 and the surface of the vehicle to which the second connector 40 is mounted. The nubs 84 preferably hemispherical and extend three thirty seconds ($\frac{3}{32}$) of an inch from the bottom surface of the second connector 40. This short distance, coupled with the fact that the nubs 84 are only disposed upon one edge of the connector 40, allows the magnetic field created by the magnets 86 to hold the second connector 40 in the desired position upon the vehicle. By creating a space between the magnets 86 and the vehicle, damage to the paint of the vehicle may be avoided. However, in other embodiments, the nubs 84 are eliminated and the magnets 86 are polished so as to avoid any scratching. In others, the magnets 86 are recessed slightly within the bottom surface of the second connector 40 to provide the desired gap. In others, a thin protective coating is disposed along the mating surfaces of the magnets 86, while in still others no scratch avoidance means are employed and the painted metal surface of the vehicle is protected by careful attachment and removal of the second connector 40. Finally, it is noted that, although the nubs 84 and magnets 86 have been described with reference to the second connector 40, this system may also be employed in connection with the first connector described above with reference to the first rod.

Figure 6:
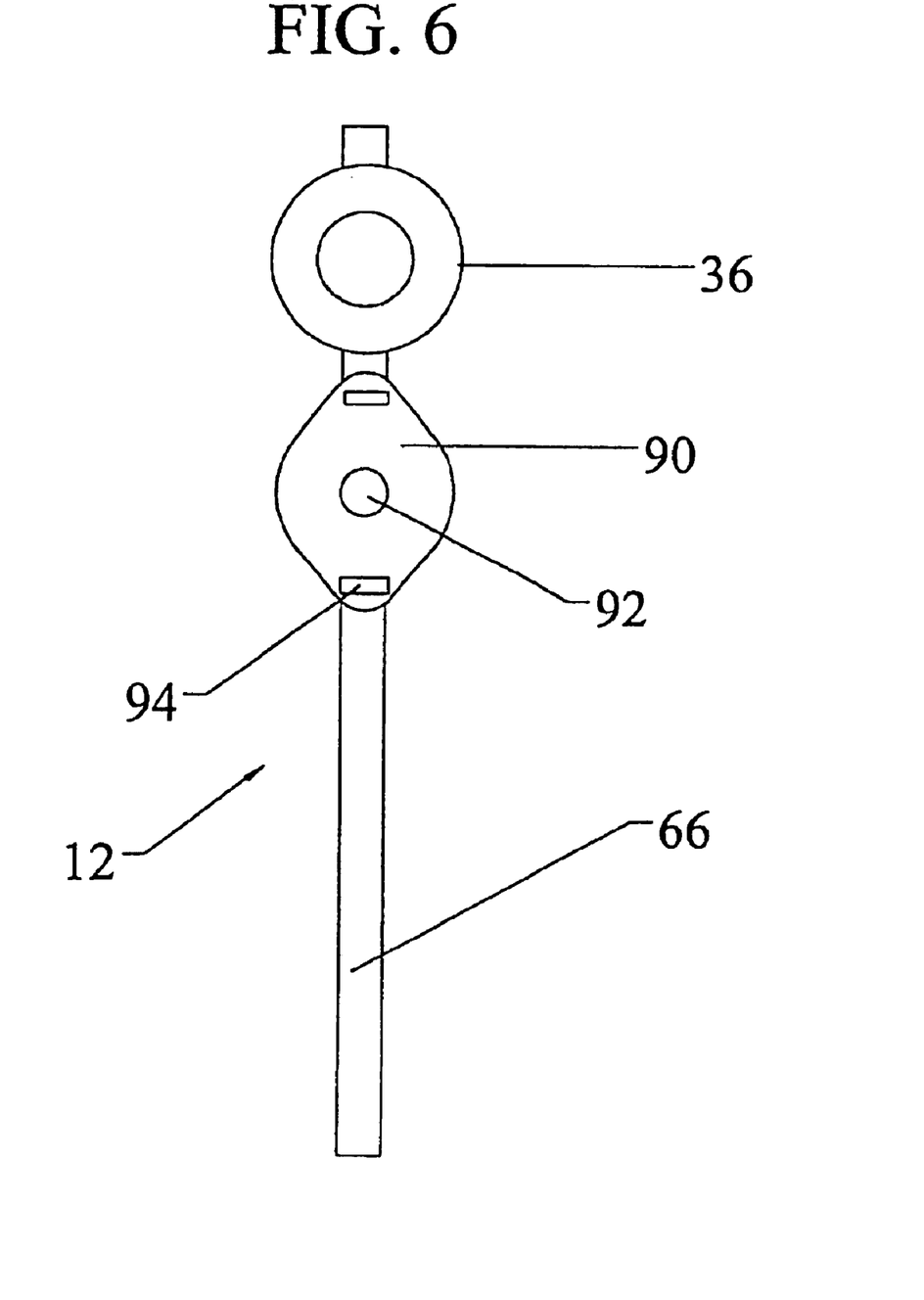
FIG. 6 is a front view of the top portion of one embodiment of the first rod of the system of the present invention having a lighting apparatus attached thereto.

Referring now to FIG. 6, an alternative embodiment of the first rod 12 is shown in which a light 90 is attached to the extension section 66 of the rod 12 below the first target 36. In this embodiment, the light 90 preferably includes a high intensity, low power consumption, bulb 92 that provides illumination of the first target 36 for ease of alignment at night. Further, the inclusion of the light 90 allows the first rod to also be utilized as an emergency light for a boat, snowmobile, or the like that is carried by the trailer. The light 90 preferably is attached to the extension section 66 via a pair of plastic ties 94, such as the type typically utilized in the bundling of electrical wires. However, other means of attaching the light 90 may also be utilized. For example, in some embodiments the light 90 is adapted to mate with a hook disposed upon the bottom of the target in order to allow easy attachment and removal of the light. In others, hose clamps or threaded fasteners are utilized.

Figure 7A:
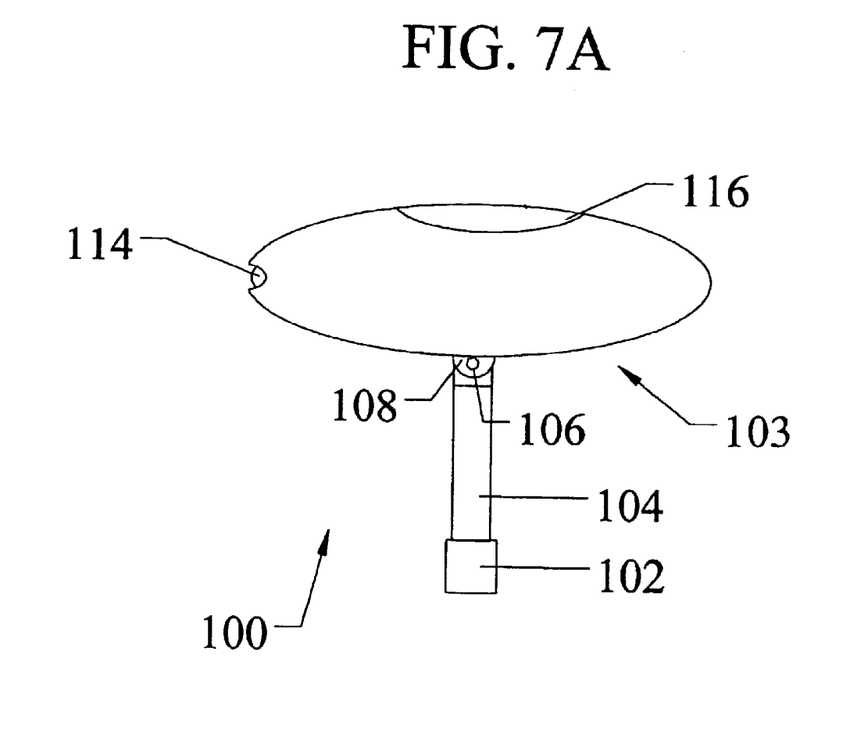
FIG. 7 is an isometric view of the preferred adjustable light for use with rod based trailer hitch alignment systems and kits.
Figure 7B:
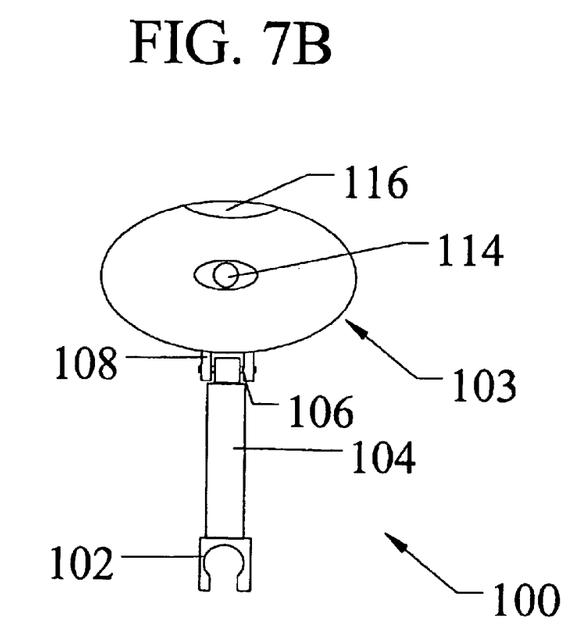

Referring now to FIGS. 7 and 8, the preferred that light be a specialized adjustable light 100 that is mounted to the rod 12 via a clip 102 that is disposed about and exerts a spring force upon the rod 12. The clip 102 is preferably mounted to the illumination portion 103 of the light 100 via an arm 104 that is pivotal connected thereto in order to allow the light to be aimed at the target. This pivotal connection is preferably accomplished via a pin 106 and clevis 108-type system. However, those skilled in the mechanical arts would recognize that there are a variety of other ways to accomplish such a connection.

The preferred light portion 103 is an X-Light® brand light sold by LRI, Inc., of Blachely, Oreg. This light is preferred due to its high intensity and proven reliability. However, it is recognized that other light portions 103 may be substituted to achieve similar results. The light portion 103 includes a light bulb 114, which is preferably a high intensity light emitting diode, and a switch 116 that allows the bulb 114 to remain illuminated when pressed once and to cease illumination when pressed a second time. However, other types of switches 116 and/or bulbs 114 may be substituted to achieve similar results.

When used with the trailer hitch alignment system of the present invention, the adjustable light may be mounted of the first rod proximate to the first target to provide short distance illumination thereof, or may be mounted to the second rod proximate the second target and is aimed at the first target such that the reflection of the light from the first target indicates proper alignment as the vehicle is backed toward the trailer. However, the use of such an adjustable light 100 is unique when applied to any rod based trailer hitch alignment systems and, therefore, it is understood that embodiments of the alignment system utilizing the adjustable light 100 need not have all of the components of the basic system described above.

Although the invention has been described herein relative to a system attached to a vehicle, it is envisioned that it will be sold as a kit of parts that may be assembled to form the system. Accordingly, it is recognized that such a kit is part of the present invention.

Finally, although the present invention has been described in considerable detail with reference to certain preferred versions thereof, other versions would be readily apparent to those of ordinary skill in the art. Therefore, the spirit and scope of the claims should not be limited to the description of the preferred versions contained herein.

What is claimed is:

1. A hitch alignment system comprising:
    a first rod comprising:
        a bottom, a sidewall and a top;
        a first target, situated substantially parallel to and attached to said sidewall of said first rod: and
        a first connector comprising a top attached to said bottom of said first rod and a bottom adapted for attachment to a surface of a first vehicle;
    a second rod comprising:
        a bottom, a sidewall and a top;
        a second target substantially perpendicularly attached to said top of said second rod dimensioned to guide said second, target into close proximity with said first target; and
        a second connector comprising a top attached to said bottom of said second rod and a bottom adapted to attach said second rod to a surface of a second vehicle, and
    wherein said bottom of at least one of said first connector and said second connector further comprises at least one magnet, and wherein said bottom of at least one of said first connector and said second connector further comprises a plurality of substantially elastic nubs dimensioned both to prevent contact between said at least one magnet and a surface and to allow said at least one magnet to exert a sufficient magnetic field upon said surface to allow said connector to remain attached to said surface.

2. The system of claim 1 wherein both said first rod and said second rod further comprise means for adjusting a length of said rod.

3. The system of claim 2 wherein said means for adjusting a length of said rod comprises:
    an extension section;
    a base section telescopically engaging said extension section; and
    means for holding said extension section stationary with respect to said base section.

4. The system of claim 3 further comprising a secondary extension section telescopically engaging said extension section, and means for holding said second extension section stationary with respect to said extension section.

5. The system of claim 1 wherein at least one of said first target and said second target is a reflector.

6. The system of claim 1 further comprising a light.

7. The system of claim 6 wherein said light is an adjustable light comprising:
    a light portion;
    an arm pivotally attached to said light portion at one end and
    a rod clip attached to a second end of said arm and dimensioned to engage and exert a spring force upon said rod.

8. A hitch alignment system comprising:
    a second rod comprising a bottom, a sidewall, a top, and a second connector comprising a top attached to said bottom of said second rod and a bottom adapted to attach said second rod to a surface;
    a first rod comprising a bottom, a sidewall, a top, and a first connector comprising a top attached to said bottom of said second rod and a bottom adapted to attach said second rod to a surface; and
    at least one adjustable light, said adjustable light comprising:
        a light portion;
        an arm pivotally attached to said light portion at one end;
        a rod clip attached to a second end of said arm, said rod clip being and dimensioned to engage and exert a spring force upon said sidewall of one of said first rod and said second rod.

9. The system of claim 8 wherein said bottom of at least one of said first connector and said second connector further comprises at least one magnet.

10. The system of claim 9 wherein said at least one magnet is recessed within said bottom of one of said first connector and said second connector a depth sufficient to prevent contact between said at least one magnet and a surface and to allow said at least one magnet to exert a sufficient magnetic field upon said surface to allow said connector to remain attached to said surface.

11. The system of claim 9 wherein said bottom of at least one of said first and said second connector further comprises a protective coating over said at least one magnet, said coating being of a thickness and a material to substantially block said at least one magnet from marring a surface and to allow said at least one magnet to exert a sufficient magnetic field upon said surface to allow said connector to remain attached to said surface.

12. The system of claim 8 wherein said bottom of at least one of said first and said second connector further comprises at least one suction cup dimensioned to attached said connector to a surface.

13. The system of claim 8 wherein both said first rod and said second rod further comprise means for adjusting a length of said rod.

14. A hitch alignment system comprising:
    a first rod comprising:
        a bottom, a sidewall and a top;
        a first target, situated substantially parallel to an attached to said sidewall of said first rod; and
        a first connector comprising a top attached to said bottom of said first rod and a bottom adapted for attachment to a surface of a first vehicle;
    a second rod comprising:
        a bottom, a sidewall and a top;
        a second target substantially perpendicularly attached to said top of said second rod dimensioned to guide said second target into close proximity with said first target; and a second connector comprising a top attached to said bottom of said second rod and a bottom adapted to attach said second rod to a surface of a second vehicle, and wherein said bottom of at least one of said first connector and said second connector further comprises at least one magnet, and wherein said at least one magnet is recessed within said bottom of one of said first connector and said second connector a depth sufficient to prevent contact between said at least one magnet and a surface and to allow said at least one magnet to exert a sufficient magnetic field upon said surface to allow said connector to remain attached to said surface.

15. The system of claim 14 wherein both said first rod and said second rod further comprise means for adjusting a length of said rod.

16. The system of claim 15 wherein said means for adjusting a length of said rod comprises:

an extension section;

a base section telescopically engaging said extension section; and means for holding said extension section stationary with respect to said base section.

17. The system of claim 16 further comprising a secondary extension section telescopically engaging said extension section, and means for holding said second extension section stationary with respect to said extension section.

18. The system of claim 14 wherein at least one of said first target and said second target is a reflector.

* * * * *